United States Patent
Faull et al.

(10) Patent No.: US 7,806,380 B2
(45) Date of Patent: Oct. 5, 2010

(54) THREE-PIECE FURNITURE SWIVEL

(76) Inventors: Ted W. Faull, P.O. Box 627, Niles, OH (US) 44446; James K. Faull, P.O. Box 627, Niles, OH (US) 44446

( * ) Notice: Subject to any disclaimer, the term of this patent is extended or adjusted under 35 U.S.C. 154(b) by 98 days.

(21) Appl. No.: 12/233,696

(22) Filed: Sep. 19, 2008

(65) Prior Publication Data
US 2009/0101786 A1     Apr. 23, 2009

Related U.S. Application Data

(60) Provisional application No. 60/980,811, filed on Oct. 18, 2007.

(51) Int. Cl.
*A47B 91/00* (2006.01)
(52) U.S. Cl. .................... 248/349.1; 403/164
(58) Field of Classification Search .............. 248/349.1, 248/521, 486.1, 425; 108/103; 403/164; 384/297, 400; 297/344.21
See application file for complete search history.

(56) References Cited

U.S. PATENT DOCUMENTS

| | | | |
|---|---|---|---|
| 3,445,147 A | 5/1969 | Niemi | |
| 3,574,427 A | 4/1971 | Faull | |
| 3,593,954 A | 7/1971 | Ritchie et al. | |
| 4,076,346 A | 2/1978 | McMahan, Sr. | |
| 4,309,121 A | 1/1982 | Salame | |
| 4,640,486 A | 2/1987 | Neville | |
| 7,328,952 B2 * | 2/2008 | Guerrini | ................ 297/344.21 |

* cited by examiner

*Primary Examiner*—Ramon O Ramirez
(74) *Attorney, Agent, or Firm*—McKay & Associates, P.C.

(57) ABSTRACT

A furniture swivel of the thrust bearing type is taught herein having a top plate and bottom plate made entirely of an internally-lubricated polymer. A central top hole surface projects upwardly and integrally from the top plate, and a central top annular surface projects upwardly and integrally from the same plate wherein two flat, raised annular surfaces are integrally defined on the top inside surface of the top plate made of the polymer. The bottom plate is substantially similar to the top plate made entirely of the polymer and has a raised central bottom hole surface in face-to-face relation with the central top hole surface and a raised bottom annular surface in face-to-face relation with the top annular surface, wherein load support and low-friction rotation is maintained without overlain metal components.

16 Claims, 3 Drawing Sheets

THREE-PIECE FURNITURE SWIVEL

SPECIFIC REFERENCE

The instant application hereby claims priority to provisional application Ser. No. 60/980,811 filed Oct. 18, 2007.

BACKGROUND

Thrust bearing assemblies are generally those types of bearings which provide for rotation between bodies but also support a vertical or axial load. For example, furniture swivels are of the thrust bearing type because a bar-stool or television mount requires low-friction rotation between a pair of bodies and at the same time must support a person or device.

As was previously known, ball bearings were incorporated to allow for the low friction rotation while simultaneously supporting the load. In principle, such a ball thrust is well-suited for these uses. However, as a practical matter, only cost considerations have compelled the use of such low-cost bearings, and unfortunately they have not always been satisfactory, especially for long-term use. For example, after a period of time the typical ball thrust bearing becomes noisy and erratic or sticky in operation even if it worked well when new. This is especially true when dust and dirt is allowed to accumulate on the bearing and/or when lubrication is neglected.

To solve the above and other inherent problems associated with ball-bearings, furniture thrust bearing assemblies were taught which eliminated the ball bearings. A pair of metal plates were pivotally connected together about a central axis, and incorporated into the plates were projecting metal bosses. Then each boss was overlaid with a plastic disk such that each disk was able to communicate with each other and provided for low-friction rotation and support. For example, see U.S. Pat. No. 3,445,147 to Niemi et al. Interposed between metal plates and metal bosses are plastic rings, which form the bearing. Also, in U.S. Pat. Nos. 3,574,427 and 4,076,346 it can be seen how ball bearings do not have to be used if some type of plastic insert is mounted on a rotating metal plate.

Although the life of the bearing was increased using the designs above, over time and in instances when there was a slight error in manufacture or design, the metal plates would ultimately come into partial contact, for example when the plastic inserts were misaligned or worn, and obviously, metal rubbing against metal resulted in high friction contact, noise, and damage to the swivel. Although necessary when using metal, an interposed plastic disk or insert on each metal plate and around the central rivet increased the number of swivel parts, increased manufacturing cost and increased the possibility of manufacturing error and ultimate failure of the bearing.

There is a need then for a dual-plate thrust bearing which eliminates the non-integral plastic insert, but which also retains the desired function of load support and low-friction rotation without the use of ball-bearings.

SUMMARY

The instant invention comprehends a furniture swivel including a top plate having a top outside surface and a top inside surface. The top plate is made entirely of an internally-lubricated polymer. Then, a central top hole is defined within a center of the top plate and a central top hole surface projects upwardly and integrally from the top inside surface forming a perimeter of the central top hole. A central top annular surface projects upwardly and integrally from the top inside surface raised a height identical to the central top hole surface, the central top annular surface concentric to the central top hole surface encircling the central top hole, wherein two flat, raised annular surfaces are integrally defined on the top inside surface of the top plate made of the polymer. A bottom plate is substantially similar to the top plate and made entirely of the same polymer having a raised central bottom hole surface in face-to-face relation with the central top hole surface and a raised bottom annular surface in face-to-face relation with the top annular surface. Accordingly, load support and low-friction rotation is maintained without overlain metal components.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated kit assembly, and such further applications of the principles of the invention illustrated herein, as would normally occur to persons skilled in the art to which the invention relates. This detailed description of this invention is not meant to limit the invention, but is meant to provide a detailed disclosure of the best mode of practicing the invention.

Figure 1:
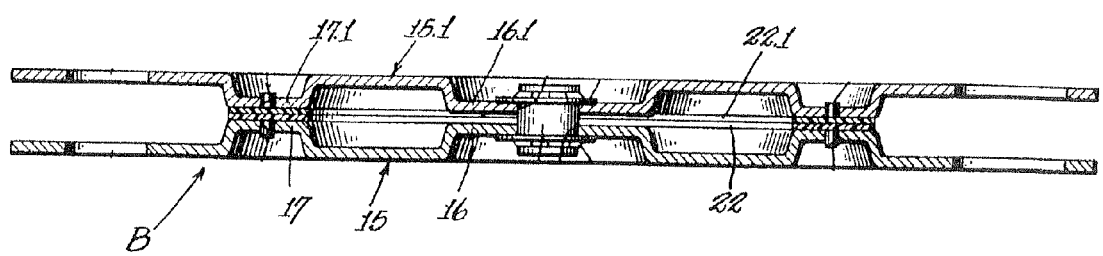
FIG. 1 is a cross-sectional view of the prior art furniture swivel.
Figure 2:
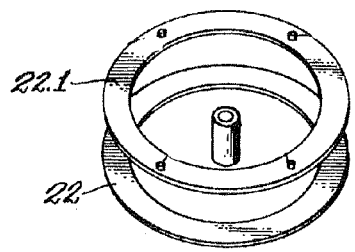
FIG. 2 is a perspective view of the prior art plastic body which encircles the pivot shaft and separates the two metal rotating plates.
Figure 3:
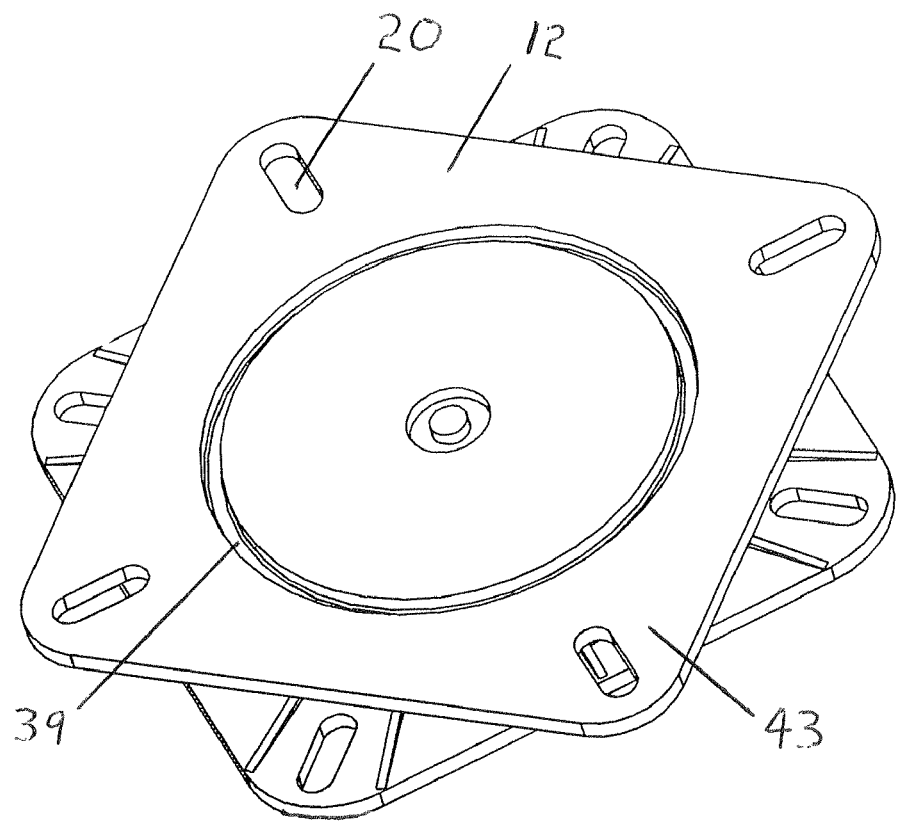
FIG. 3 is a top perspective view of the instant invention.

FIGS. 1 and 2 show the prior art bearing assembly. The prior art bearing assembly B comprises a pair of metal plates, 15, 15.1 pivotally connected together in face-to-face relation for rotation about a central axis normal to the plane in which the plates are disposed. As in the instant invention, the upper plate 15.1 is adapted to be suitably secured to the underside of a stool seat or similar while the lower plate is adapted to be suitably secured to the upper side of a base.

Further in this prior art embodiment, plate 15 is generally square with a central, flat-topped, upwardly projecting boss 16 surrounded by an annular, flat-topped, upwardly projecting boss 17 concentric with the central boss 16. Importantly, to reduce friction between the bosses 17, 17.1 of the plates 15, 15.1, plastic disks 22, 22.1 overlay the respective boss flat surfaces. In assembling the bearing assembly, the plate 15 is assembled with its disk 22 and the plate 15.1 is assembled with its disk 22.1. The plates are then disposed in face-to-face relation with the disks 22, 22.1 in abutment.

With reference then to the instant invention and as depicted by FIGS. 3-8, a generally rectangular, top plate 12 is adapted to be mounted to an underside of a stool seat or the like using mounting holes 20, with the top outside surface 43 of the top plate 12 being flat and configured to rest flush against the underside of the furniture seat. Critical to this invention, top plate 12 is made of a polymer in its entirety (all components), and in the preferred embodiment, the polymer can be General Electric Company's LNP™ Verton™ Compound RVL28. This compound is based on Nylon 66 resin containing Long Glass Fiber, PTFE and is well-suited to the instant invention because it is easily molded, heat stabilized, and internally lubricated. Preferably, any polymer can be used which is similar to these design characteristics if it can be easily molded, heat stabilized, and internally lubricated. Among the other property benefits, by using this advanced polymer material, there is no need for any metal components, and thus no requirement for plastic inserts. Accordingly, the desired function of load support and low-friction rotation is maintained without the use of ball-bearings, plastic disks, and metal plates. Thus, the instant invention is actually only three main components inclusive of the two plates and central rivet. Additional features are also necessary to maintain the desired function without using any metal components, as follows.

Specifically, a central top hole 41 (FIG. 6) is defined within the center of the top plate 12. A flat, central top hole surface 42 projects upwardly from the top inside surface 43a to form the perimeter of the central top hole 41. This central top hole surface 42 for instance (not limited thereto) is raised a distance of 0.038 inches from the top inside surface 43a. Also raised slightly from the top inside surface 43a the same height as the central top hole surface 42 is the top annular surface 40. The top annular surface 40 is a flattened ring encircling the central top hole 41. Thus, there are two flat, annular surfaces integrally defined on the top inside surface 43a of the top plate 12 made of the polymer.

Opposing the top plate 12 is a generally rectangular bottom plate 14 (FIG. 5) adapted to be mounted to the top of a furniture base, for example a bar stool base. The bottom plate 14 is substantially similar to the top plate 12 in design. "Substantially similar" as defined herein refers to the bottom plate 14 either being identical to the top plate 12 or having some minor modifications such as the omission of the ribs (below) or having only dimensional differences. Some dimensional modifications may be desired if the furniture piece for instance has more limited space on the bottommost component.

A central bottom hole 32 is defined within the center of the bottom plate 14. A flat, central bottom hole surface 36 projects upwardly from the bottom inside surface 47a to form the border of the central bottom hole 32. This central bottom hole surface 36 for instance (not limited thereto) is raised a distance of 0.038 inches from the bottom inside surface 47a. Also raised slightly from the bottom inside surface 47a the same height as the central bottom hole surface 36 is the bottom annular surface 34. The bottom annular surface 34 is a flattened ring encircling the central bottom hole 32. Thus, there are two flat, annular surfaces integrally defined on the bottom inside surface 47a of the bottom plate 14 made of the polymer.

Figure 4:
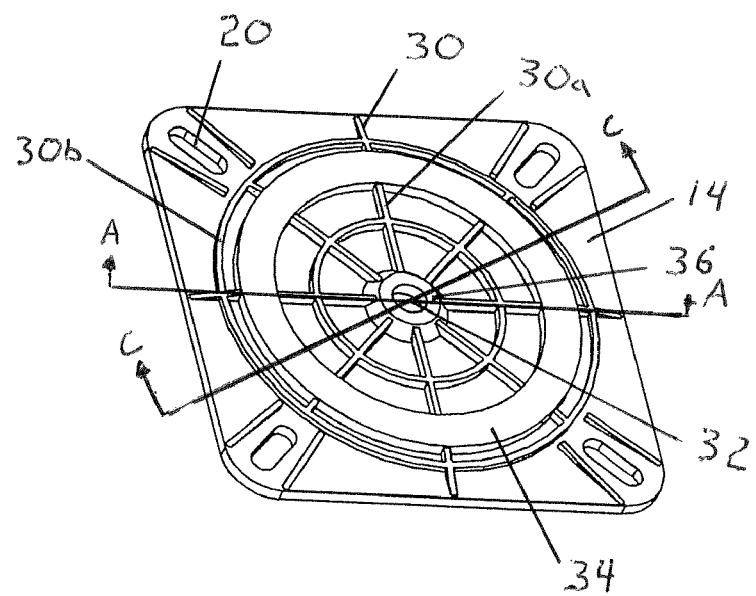
FIG. 4 is a top perspective view of the bottom plate of the instant invention.
Figure 5:
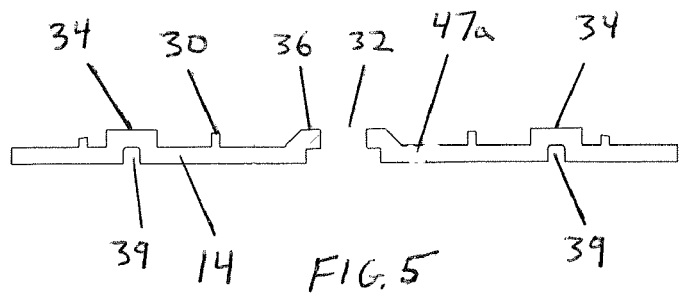
FIG. 5 is a cross-sectional view of the bottom plate through section C-C.
Figure 6:
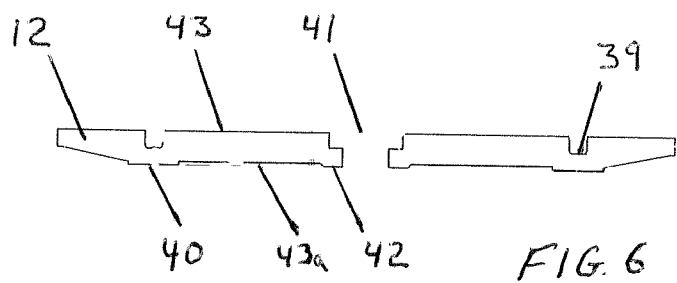
FIG. 6 is a cross-sectional view of the top or bottom plate through section A-A.
Figure 7:
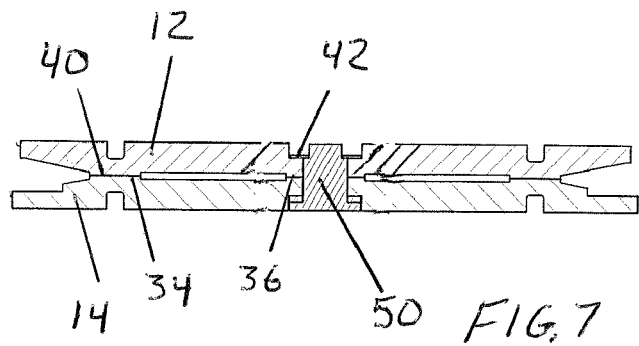
FIG. 7 is a cross-sectional view of the present swivel when assembled through section A-A.
Figure 8:
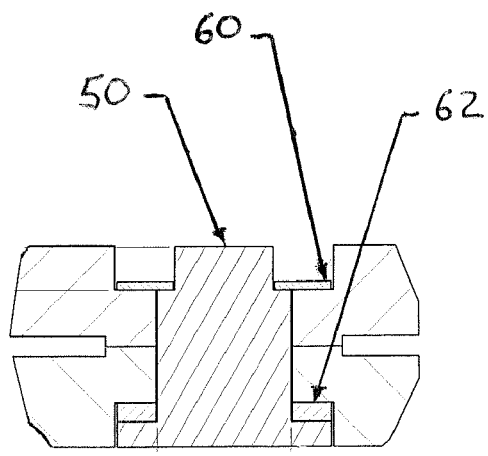
FIG. 8 is an enlargement of the rivet as shown in FIG. 7.

Because no rigid, metal components are used, it is preferable that the bottom plate 14 and top plate 12 contain some type of support means to add to the rigidity of the somewhat flexible material. Aiding both the function of the plate and the aesthetics of the surfaces, shown are a plurality of ribs 30 disposed thereon. With reference to FIG. 4, the ribs 30 are shown arranged in a star-like fashion on the bottom plate 14. These may also be formed on the top plate 12 (not shown). In the preferred embodiment as shown, the most efficient arrangement of the ribs 30 consists of linear ribs 30a spaced every forty-five degrees traveling from near (proximate to outer edge) central bottom hole 32 to the edge of the plate, and then one or more radial ribs 30b formed concentric with the bottom hole 32 with the outermost rib being larger in diameter than bottom annular surface 34, and the innermost rib disposed medially between bottom annular surface 34 and central bottom hole surface 36.

Should the ribs 30 increase the weight and/or cost of manufacture because of the amount of polymer used, the top inside surface 43 and/or bottom inside surface can have defined thereon a circular groove 39 aligned diametrically with and underlying each annular surface 34, 40 of the top or bottom plate ("or" meaning one or the other individually or on both plates) which in turn lessens the amount of polymer needed and further increases the flexibility or "give" of the annular surfaces 34, 40 when in face-to-face relation with one another.

When assembled, the polymer-based top plate 12 is joined to the polymer-based bottom plate 14 with the bottom annular surface 34 in face-to-face relation with the top annular surface 40. A rivet 50 maintains the top plate 12 against the bottom plate 14. For instance a nylon washer 62 abuts the surfaces of the rivet 50 and the bottom plate 14, and a metal washer 60 is situated around the top of the rivet 50 on the top plate 12. The central bottom hole surface 36 is situated in face-to-face relation with the central top hole surface 42. Accordingly, the polymer-based annular surfaces 34, 40 and hole surfaces 36, 42 are the points of low-friction contact which form the beating. The bearing surfaces are built into the plates, and are thus integral thereto. Although the function of low-friction plastic disks are desirable, by the instant invention there is no need to provide extra plastic disks to overlay the respective boss flat surfaces because there is no metal surface on the bearing which requires a low-friction overlay. The desired function of load support and low-friction rotation is maintained by the instant three-piece design.

We claim:

1. A furniture swivel, comprising:
   a top plate having a top outside surface and a top inside surface, said top plate made entirely of an internally-lubricated polymer;
   a central top hole defined within a center of said top plate;
   a central top hole surface projecting upwardly and integrally from said top inside surface forming a perimeter of said central top hole;
   a central top annular surface projecting upwardly and integrally from said top inside surface raised a height identical to said central top hole surface, said central top annular surface concentric to said central top hole surface encircling said central top hole, wherein two flat, raised annular surfaces are integrally defined on said top inside surface of said top plate made of said polymer; and,
   a bottom plate substantially similar to said top plate made entirely of said polymer and having a raised central bottom hole surface in face-to-face relation with said central top hole surface and a raised bottom annular surface in face-to-face relation with said top annular surface, wherein load support and low-friction rotation is maintained without overlain metal components.

2. The furniture swivel of claim 1, further comprising multiple linear ribs spaced apart on said bottom plate traveling from near said central bottom hole to the edge of said bottom plate.

3. The furniture swivel of claim 2, further comprising a pair of radial ribs formed concentric with said bottom hole with an outermost rib being larger in diameter than said bottom annular surface and an innermost rib disposed medially between said bottom annular surface and said central bottom hole surface.

4. The furniture swivel of claim 2, wherein said linear ribs are evenly spaced forty-five degrees apart.

5. The furniture swivel of claim 1, further comprising multiple linear ribs spaced apart on said top plate traveling from near said central top hole to the edge of said top plate.

6. The furniture swivel of claim 5, further comprising a pair of radial ribs formed concentric with said top hole with an outermost rib being larger in diameter than said top annular surface and an innermost rib disposed medially between said top annular surface and said central top hole surface.

7. The furniture swivel of claim 5, wherein said linear ribs are evenly spaced forty-five degrees apart.

8. The furniture swivel of claim 1, further comprising a circular groove defined on said top plate or said bottom plate aligned diametrically with and underlying each said annular surface.

9. A furniture swivel, comprising:
- a top plate having a top outside surface and a top inside surface, said top plate made entirely of an internally-lubricated polymer;
- a central top hole defined within a center of said top plate;
- a central top hole surface projecting upwardly and integrally from said top inside surface forming a perimeter of said central top hole;
- a central top annular surface projecting upwardly and integrally from said top inside surface, said central top annular surface concentric to said central top hole surface encircling said central top hole, wherein two flat, raised annular surfaces are integrally defined on said top inside surface of said top plate made of said polymer;
- a bottom plate made entirely of said polymer and having a raised central bottom hole surface in face-to-face relation with said central top hole surface and a raised bottom annular surface in face-to-face relation with said top annular surface;
- a rivet maintaining said top plate against the bottom plate;
- a washer made entirely of said polymer abutting the surfaces of the rivet and said bottom plate; and,
- a washer situated around the top of the rivet on the top plate;
- wherein load support and low-friction rotation is maintained without overlain metal components.

10. The furniture swivel of claim 9, further comprising multiple linear ribs spaced apart on said bottom plate traveling from near said central bottom hole to the edge of said bottom plate.

11. The furniture swivel of claim 10, further comprising a pair of radial ribs formed concentric with said bottom hole with an outermost rib being larger in diameter than said bottom annular surface and an innermost rib disposed medially between said bottom annular surface and said central bottom hole surface.

12. The furniture swivel of claim 10, wherein said linear ribs are evenly spaced forty-five degrees apart.

13. The furniture swivel of claim 9, further comprising multiple linear ribs spaced apart on said top plate traveling from near said central top hole to the edge of said top plate.

14. The furniture swivel of claim 13, further comprising a pair of radial ribs formed concentric with said top hole with an outermost rib being larger in diameter than said top annular surface and an innermost rib disposed medially between said top annular surface and said central top hole surface.

15. The furniture swivel of claim 13, wherein said linear ribs are evenly spaced forty-five degrees apart.

16. The furniture swivel of claim 9, further comprising a circular groove defined on said top plate or said bottom plate aligned diametrically with and underlying each said annular surface.

* * * * *